UNITED STATES PATENT OFFICE.

JULIUS RHEINBERG, OF LONDON, ENGLAND.

PRODUCTION OF REFLECTING-SURFACES ON GLASS BY MEANS OF METALS IN THE PLATINUM GROUP.

1,385,229. Specification of Letters Patent. Patented July 19, 1921.

No Drawing. Application filed October 11, 1920. Serial No. 416,314.

*To all whom it may concern:*

Be it known that I, JULIUS RHEINBERG, a subject of the King of Great Britain, residing at London, England, have invented new and useful Improvements in or Relating to the Production of Reflecting-Surfaces on Glass by Means of Metals in the Platinum Group, of which the following is a specification.

This invention relates to the class of processes in which glass is coated with a mixture containing one of the platinum metals, by which is meant platinum, palladium or iridium, the glass being subsequently brought to a suitable temperature in a furnace, and the metal thereby burnt into the surface.

Hitherto the method adopted has been to coat the glass with a fluid or viscous mixture containing the metal, usually in the form of one of its salts, an important ingredient of this fluid or viscous mixture being resins or oils, essence or oil of lavender being most frequently used. When the glass coated with this viscous mixture is treated in the furnace, the resins or oils boil or bubble during evaporation, and this gives rise to an irregular distribution of the platinum deposit, so that after burning in, the resulting metallized surface shows a certain granularity and want of homogeneity in its structure, it also diffuses a good deal of the light falling on it, and in consequence such a surface is inapplicable for many optical purposes, for instance for first surface mirrors for process or reflex cameras.

My improvement consists in incorporating one of the platinum metals in a solution of collodion, then coating the glass with this compound, whereupon the solvents of the collodion evaporate in a few minutes at normal temperature, leaving a dry structureless collodion film on the glass. This film upon being brought to a suitable temperature in an electric furnace, completely volatilizes without ebullition and leaves an absolutely homogeneous mirror-like structureless, metallized surface free from grain and practically free from causing irregular diffusion of the light impinging on it.

I prepare the collodion by dissolving any suitable form of soluble gun cotton, such as celloidin or pyroxylin in methyl alcohol and then add to it a solution, preferably in ethyl alcohol, of the platinum salt, or the salt of a metal in the platinum group. Some of the salts suitable for the purpose are platinum chlorid $PtCl_4$, chloroplatinic acid $H_2PtCl_6$, palladium chlorid $PdCl_2$, iridium chlorid $IrCl_4$, chlor-iridic acid $H_2IrCl_6$. The collodion coating mixture may if desired be conveniently thinned down by a further addition of ethyl alcohol. These salts may be used singly or in combination.

The temperature to which the glass is subsequently raised in the furnace will determine whether the structureless mirror surface is (1) in the form of a loose deposit, (2) an adherent deposit, (3) a deposit partially adherent and partially incorporated within the surface layer of the glass (partial burning in), or (4) completely incorporated within the surface layer of the glass (completely burnt in). These four stages are reached successively at successive increases of temperature, but the actual temperature required for each stage depends likewise upon the composition of the glass, and has to be determined experimentally. The temperature to attain stage (1) does not exceed 500° C., for any kind of glass; to attain stage (4) the temperatures in general range from 600° to 750° C. Ordinary kinds of plate glass, for example attain to stage (4) at temperatures from about 690° to 740° C., whereas for ordinary kinds of crown glass the temperatures average about 30° C. lower.

In order to avoid disturbances of the glass surface itself, and to keep it as near as may be optically flat in the case of a plane mirror, or true to its curvature in the case of lenses, it is very desirable that the temperatures to which any glass should be raised should be the minimum possible, and a further improvement in my process therefore consists in the addition of a very small proportion of a lead salt or a bismuth salt, preferably bismuth chlorid, to the collodion solution, which enables me to reduce the temperature frequently by as much as 30° C. The exact reduction of temperature achieved has to be established experimentally for every kind of glass.

The bismuth chlorid solution is conveniently made up as a 5% solution in industrial spirits adding 5% hydrochloric acid. This solution is further diluted with industrial spirits immediately before use.

A typical platinizing coating mixture would be made up as follows:—

| | |
|---|---|
| 6% celloidin dissolved in methyl alcohol | 3 parts by volume. |
| 12% platinum chlorid (chloroplatinic acid) $H_2PtCl_6$ dissolved in industrial spirits | 3 parts by volume. |
| Ethyl alcohol (industrial spirits) | 3 parts by volume. |
| 1% bismuth chlorid solution in industrial spirits | 1 part by volume. |

The platinized surface mirrors resulting from this process are perfectly transparent, owing to the absence of structure in the mirror, and have a neutral gray tint. The depth of tint can be nicely regulated by varying the proportion of the platinum in the coating mixture, but it is not practicable to produce beyond a certain depth of tint in a single coating. To increase the depth of tint, the metallized glass is re-coated and the process gone through again. It is feasible to repeat the process as often as three or four times, but in practice it is rarely necessary to give more than two coatings for fully metallized surface mirrors, or a single coating for semi-metallized mirrors.

Metallized glasses of this description find employment, among other uses, for optical and electrical purposes. Metallized surface mirrors produced in accordance with this invention replace silvered surface mirrors, over which they have the advantage of being permanent, their reflective power not being subject to deterioration, not being damaged by wiping with a dry or moistened cloth, and not being tarnishable.

What I claim is:—

1. The production on glass of surface mirrors which are homogeneous and structureless, by first coating the glass with a dry film of collodion containing one of the platinum metals, and subsequently submitting the coated glass to the requisite temperature in a furnace.

2. The production on glass of surface mirrors which are homogeneous and structureless, by first coating the glass with a dry film of collodion containing platinum, and subsequently submitting the coated glass to the requisite temperature in a furnace.

3. The production on glass of surface mirrors which are homogeneous and structureless, by first coating the glass with a dry film of collodion containing platinum chlorid, and subsequently submitting the coated glass to the requisite temperature in a furnace.

4. The production on glass of surface mirrors which are homogeneous and structureless, by first coating the glass with a dry film of collodion containing platinum chlorid and a minute quantity of a bismuth salt, and subsequently submitting the coated glass to the requisite temperature in a furnace.

JULIUS RHEINBERG.

Witnesses:
GEORGE HARRISON,
HERBERT A. BEESTON.